UNITED STATES PATENT OFFICE.

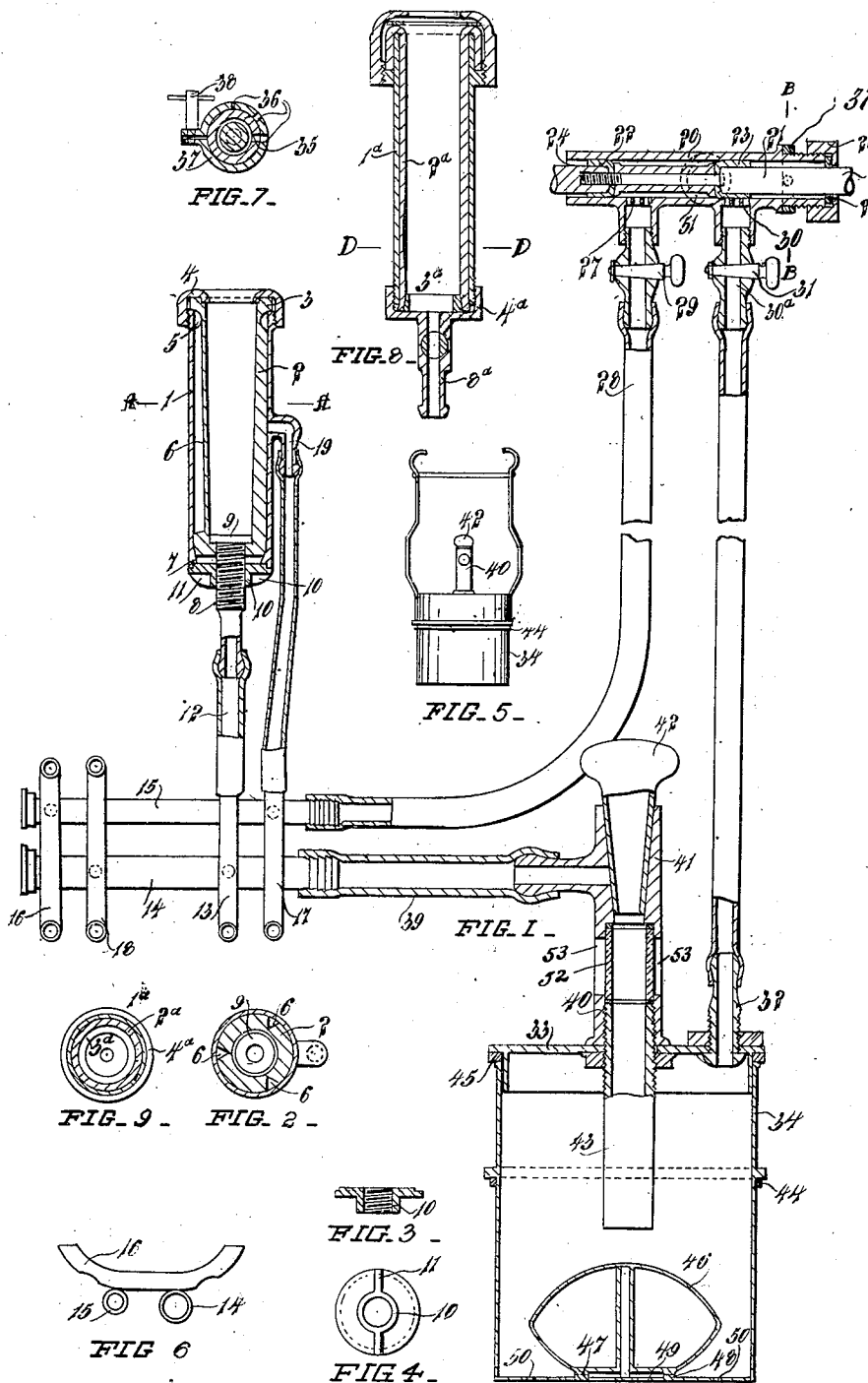

HENRY DROUTLEGE, OF PONSONBY, AUCKLAND, NEW ZEALAND.

MILKING-MACHINE.

1,060,828.

Specification of Letters Patent.

Patented May 6, 1913.

Application filed April 6, 1911. Serial No. 619,371.

*To all whom it may concern:*

Be it known that I, HENRY DROUTLEGE, a citizen of the Dominion of New Zealand, and residing at 47 Vermont street, Ponsonby, Auckland, in the Provincial District of Auckland, in the Dominion of New Zealand, have invented certain new and useful Improvements in Milking-Machines, of which the following is a specification.

The invention relates to the class of milking machines in which the milking is effected by vacuum, and in which pulsation is produced in the flexible linings of the teat cups by the alternate withdrawal and admittance of air.

The invention provides improvements in the construction of the teat cups and in the "pulsator" whereby pulsation is effected in a series of said cups; improvements are also provided in the pail head through which the milk passes to the vacuum pail.

I will describe my improvements in detail by the aid of the accompanying drawings, wherein:—

Figure 1, is a sectional elevation of the parts referred to assembled. Fig. 2, a sectional plan of the teat cup on A—A Fig. 1. Fig. 3, a central section, and Fig. 4, an inverted plan of a clamping disk of the teat cup. Fig. 5, is a front elevation of the pail head. Fig. 6, is an end elevation of the branch pipes shown in Fig. 1, and Fig. 7, an end sectional elevation of the pulsator on B—B, Fig. 1. Fig. 8, is a vertical central section, and Fig. 9, a sectional plan on D—D, Fig. 8, showing a modification in the teat cup.

I will first describe the teat cup by reference to Figs. 1 to 4 inclusive. The rigid metallic cylindrical casing 1 receives the flexible rubber pulsating inner tube 2 which at its upper end has a projecting flange 3 clamped in position by a cap 4 screwing upon the top of the casing. Tube 2 is provided upon the outside with a recessed ring 5 and longitudinal V shaped recesses 6 which are shallower at the top of the tube than at the bottom, and together with the recessed ring facilitate the pulsation of said tube and cause it to contract under pressure at its upper end in advance of the lower. The lower end of the tube 2 is clamped against a shoulder 7 extending around the inside of the casing, by a tubular screwed nipple 8 which passes through a hole in the bottom of the flexible tube and has a projecting head 9. A disk nut 10 having wings 11 by which it is turned, screws upon the nipple 8 and effects the clamping.

In a modification shown in Figs. 8 and 9 the flexible tube 2ᵃ is secured to the upper end of the casing by being turned over the upper edge of the casing and secured by a suitable cap and its lower end receives a conical nipple 3ᵃ adapted to be forced into the tube by a cap 4ᵃ which screws upon the casing and thereby clamps the tube in position. The cap has a connecting nipple 8ᵃ.

The nipple is connected by a pipe 12 (see Fig. 1) with a cross tube 13 fixed to the milk pipe member 14 of a branch piece which also comprises the pulsating pipe 15. The pipes 14 and 15 are connected by the cross tubes 13 and 18 and also by the cross tubes 16 and 17 through which pulsation of the flexible tube of the teat cups is effected. One end of the tube 17 is connected to a nipple 19 projecting from the casing 1 and through which is a hole leading to between the outside of tube 2 and inside of the casing.

The branch piece is intended to be used for four teat cups, there being one cup connected to each end of the pipes 13 and 18 respectively, and each cup being also connected to one end of the pulsating pipes 16 and 17.

The pulsator shown in Figs. 1 and 7 comprises a cylinder 20 in which a piston valve 21 having the piston heads 22 and 23, is reciprocated by any convenient means. The end 24 of the cylinder is open while the opposite end is closed by a screw cap 25 which bears against a brass washer 26. A port 27 communicates with the pulsator pipe 28 which is fitted with a stop cock 29 and leads to the pipe 15 of the branch piece. Port 30 communicates with the pipe 30ᵃ provided with a stop cock 31, and leading to a nipple 32 in the cover 33 of the cylindrical pail head 34. A port 51 intermediate between ports 27 and 30 communicates with a pipe leading to the vacuum pump of the milking plant. A port 35 opens communication with the atmosphere through one or other of a series of holes 36 of varying size in a split ring 37 rotatable upon the cylinder for the purpose of enabling the amount of air admitted to be adjusted, the ring being clamped in position by a clamping screw 38.

The milk pipe 14 of the branch piece is connected by a pipe 39 to a stand pipe 40 which is provided at the upper end with a tap 41 having a removable plug 42, and fixed at its lower end to the cover 33. A tube 43 screws into the bottom of the stand pipe and projects down into the pipe pail head thereby preventing milk from splashing into the pipe 32. The pail head fits a hole in the lid of the vacuum milk pail, an air tight joint being effected by a rubber ring 44 between the flange and the lid. A similar joint is formed by a rubber ring 45 between the lid 33 and the top of the pail head. A float valve 46 guided upon a pin projecting upwardly from the bottom of the pail head has a ring valve face 47 adapted to seat upon a ring 48 and to close ports 49 through the bottom of the pail head inside ring 48. One or more small holes 50 perforate the bottom outside of the ring.

In operation, air is by means of the reciprocation of the piston valve of the pulsator, alternately admitted to and withdrawn from the space between the tube 2 and the casing of the teat cup whereby said tube is caused to contract upon the teat and then release it. At the same time, partial vacuum is produced inside tube 2 which holds the teat, and within the vacuum pail through the ports in the pail head. The float rises upon the milk and allows it to flow through the ports 49 into the vacuum pail. At each reciprocation of the pulsator piston a small quantity of air is admitted to the pail head, and through it to inside the tube 2, thus facilitating the flow of milk and assisting the expansion of tube 2. A very small quantity of air also passes through the holes 50 into the vacuum pail, thereby reducing the vacuum therein and facilitating the rise of the float valve from its seat when the vacuum is restored in the pail head by the return of the pulsator piston. A glass tube 52 inserted in the stand pipe 40 and visible through apertures 53 enables the flow of milk to be seen.

The employment of the pail head with the float valve makes it possible to reduce the vacuum within the tube 2 of the teat cup without its being necessary to reduce the vacuum in the milk pail to the same extent.

What I do claim and desire to secure by Letters Patent of the United States is:—

1. A pulsator comprising in combination a cylinder open at one end, a piston valve reciprocable therein, two piston heads upon said valve, a vacuum port in said cylinder leading to a vacuum pump, two ports one upon each side of said vacuum port, a closure for one end of said cylinder, and means for admitting a regulatable quantity of air to that end, substantially as herein specified and illustrated.

2. In a pulsator, means for admitting a regulatable quantity of air to the interior of the cylinder comprising in combination the cylinder, a port therein, a split rotatable ring upon said cylinder, holes through said ring adapted to coincide with said port, and a clamping screw for the ring, substantially as herein specified and illustrated.

3. A pail head comprising in combination a cylindrical casing, an air tight cover therefor, a milk pipe projecting through said cover, a connection for a vacuum pipe, ports in the bottom of the casing, a guided float valve controlling said ports, and perforations through the bottom of the casing outside the seat of said float valve, substantially as herein specified and illustrated.

4. In milking machines, means for partially closing communication between the pail head and the vacuum pail, comprising in combination a cylindrical casing, ports in the bottom thereof communicating with the vacuum milk pail, a float valve adapted to close said ports, and perforations through the bottom of said casing outside the seat of said valve, substantially as herein specified and illustrated.

In testimony whereof I have signed my name to this specification in the presence of two witnesses.

HENRY DROUTLEGE.

Witnesses:
ARTHUR LEWITT FERNEYHOUGH,
HAROLD JOHN SARSFIELD BURGOYNE.

---

Copies of this patent may be obtained for five cents each, by addressing the "Commissioner of Patents, Washington, D. C."